(No Model.)  O. R. SMITH.  5 Sheets—Sheet 1.
DITCHING MACHINE.
No. 592,101.  Patented Oct. 19, 1897.
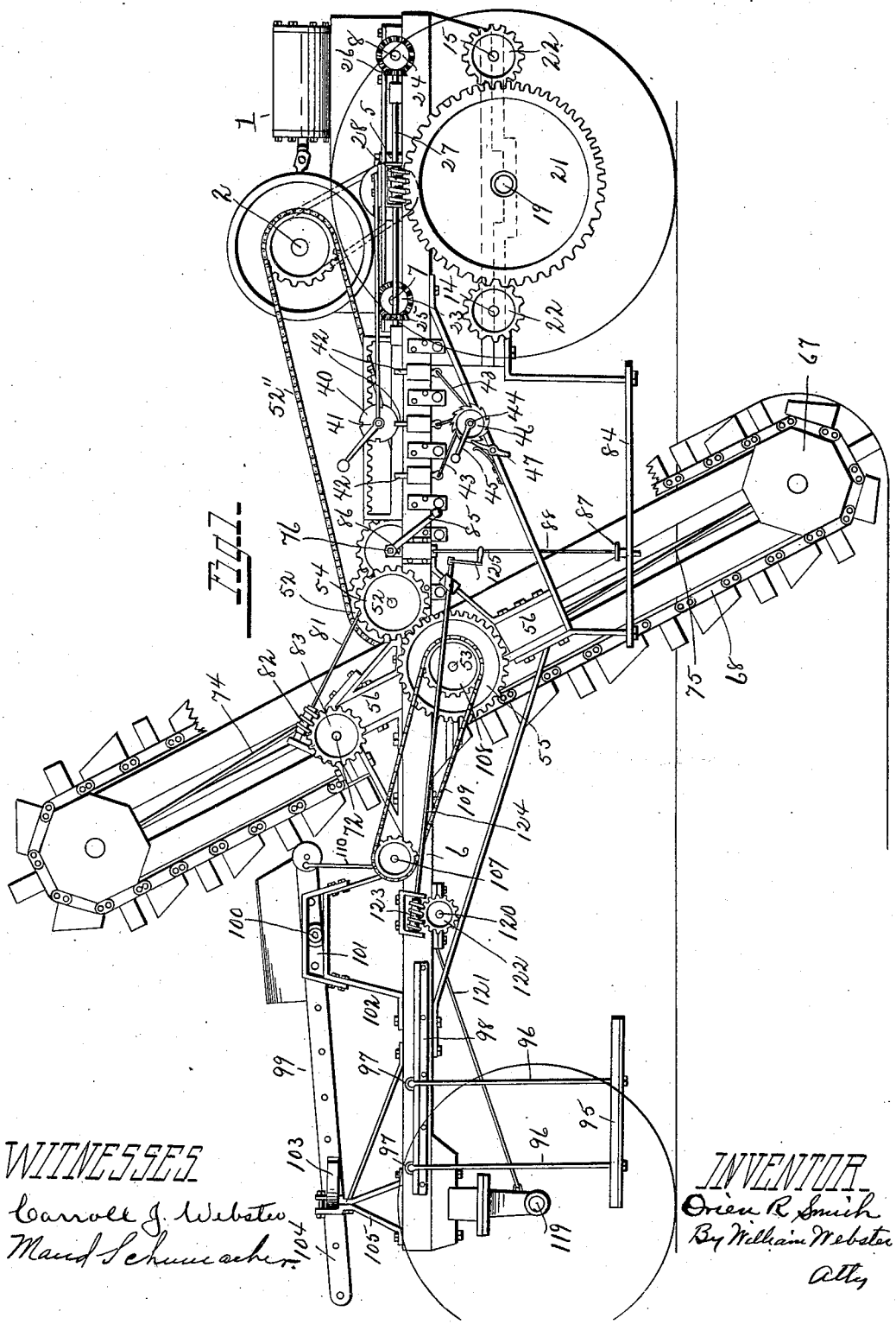
WITNESSES
Carroll J. Webster
Maud Schumacher
INVENTOR
Orien R. Smith
By William Webster
Atty

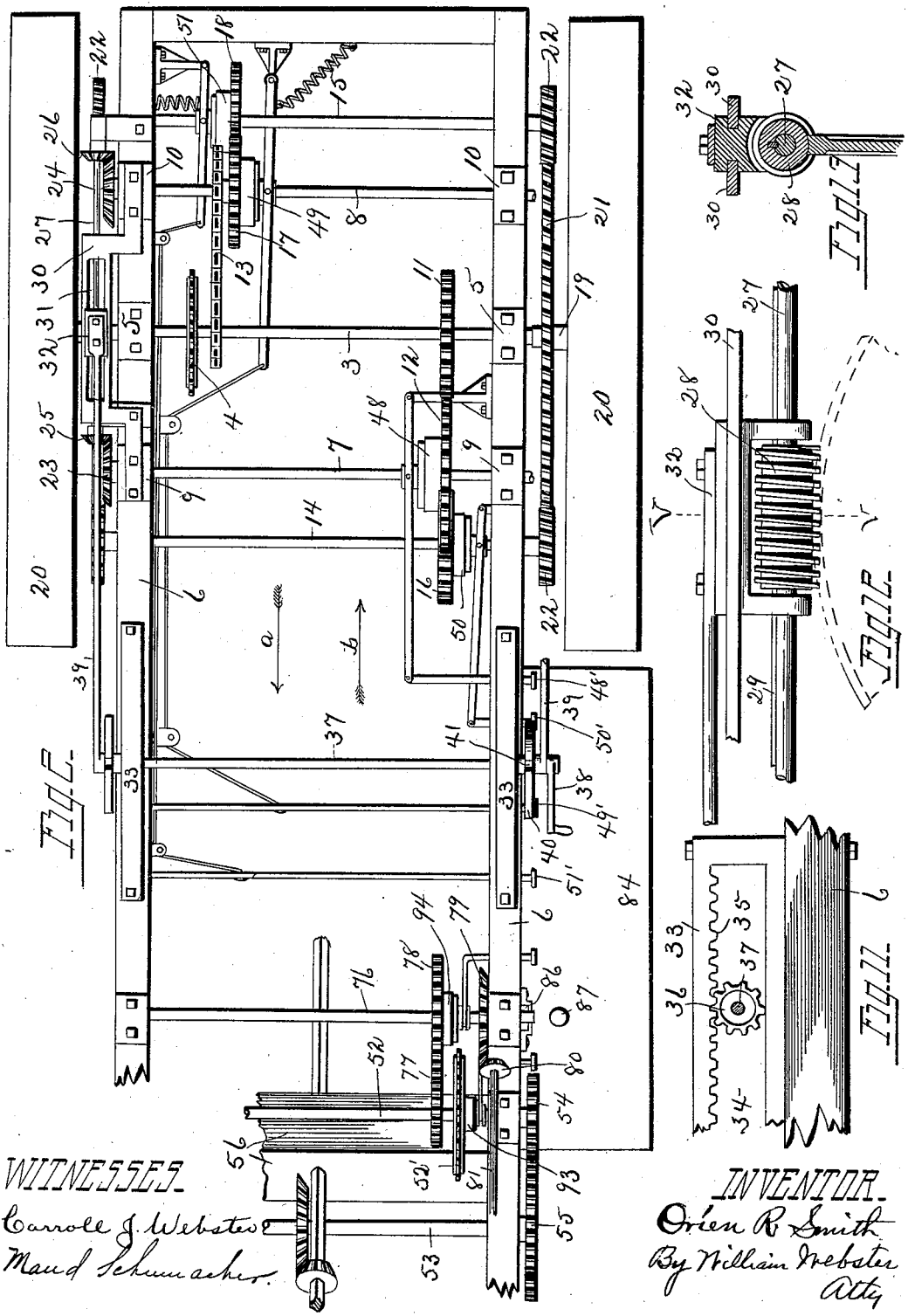

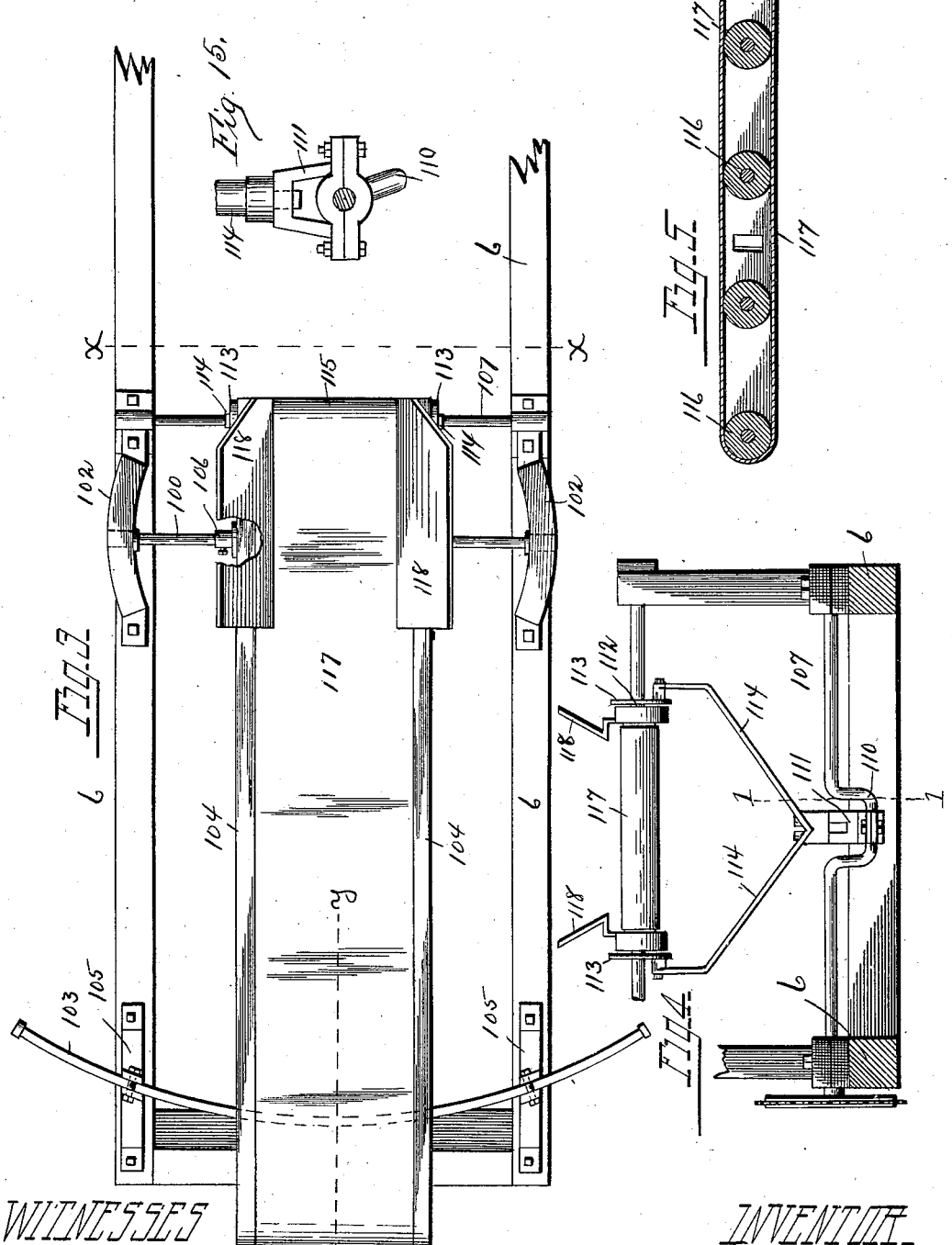

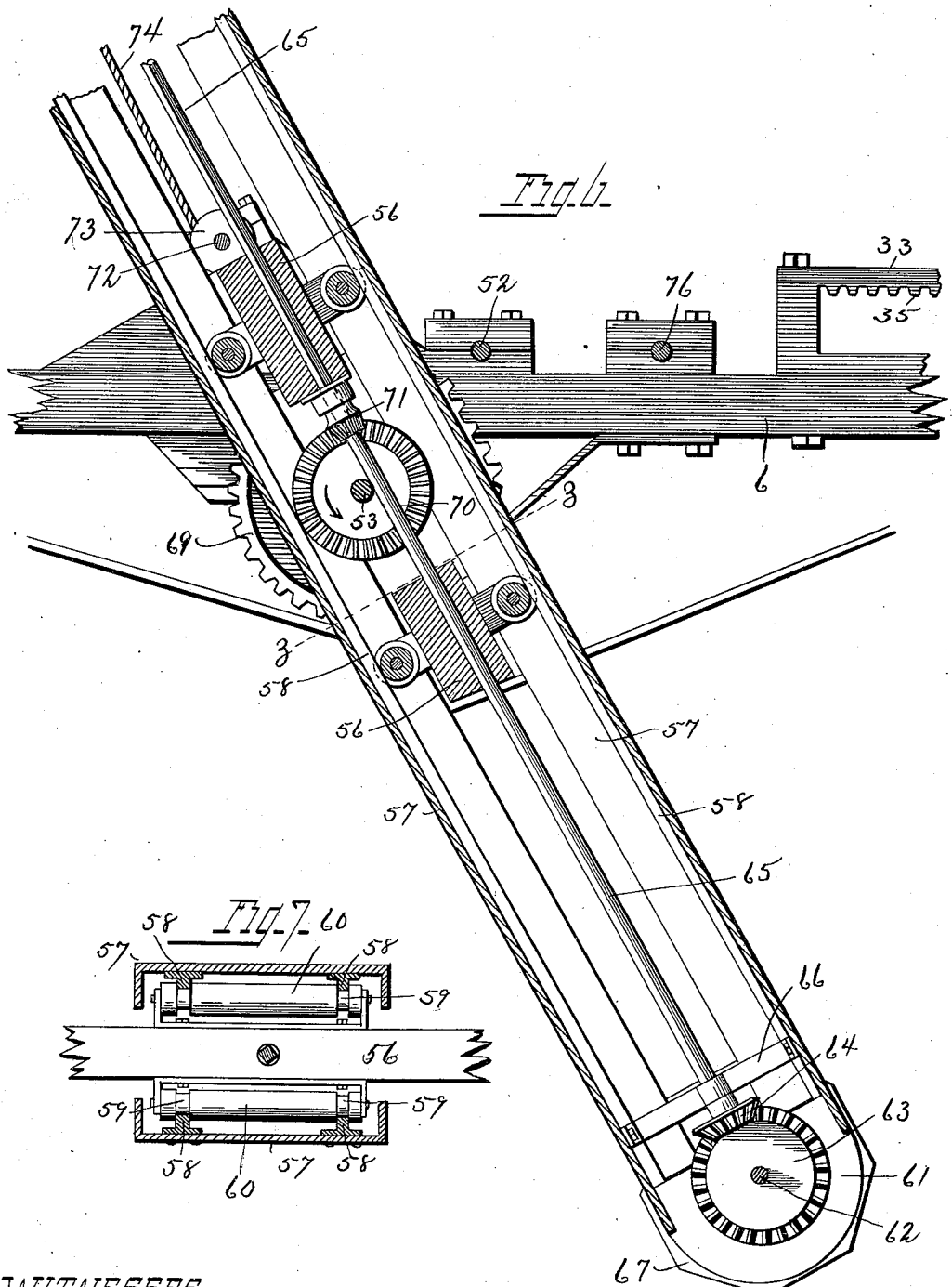

(No Model.) 5 Sheets—Sheet 5.
O. R. SMITH.
DITCHING MACHINE.
No. 592,101. Patented Oct. 19, 1897.
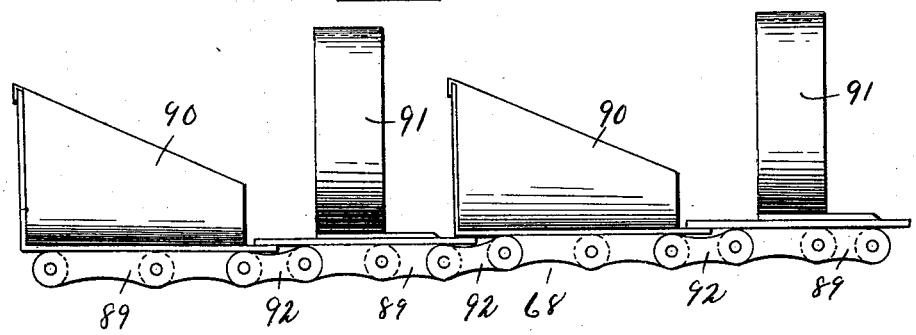
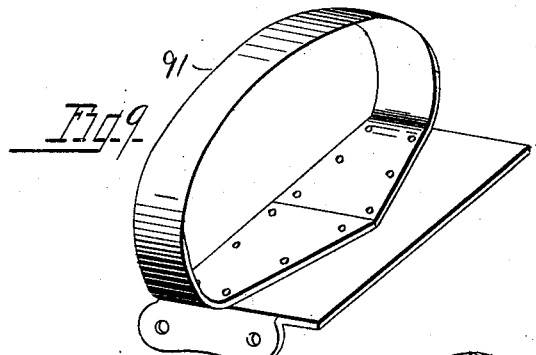
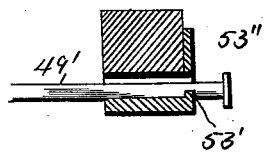
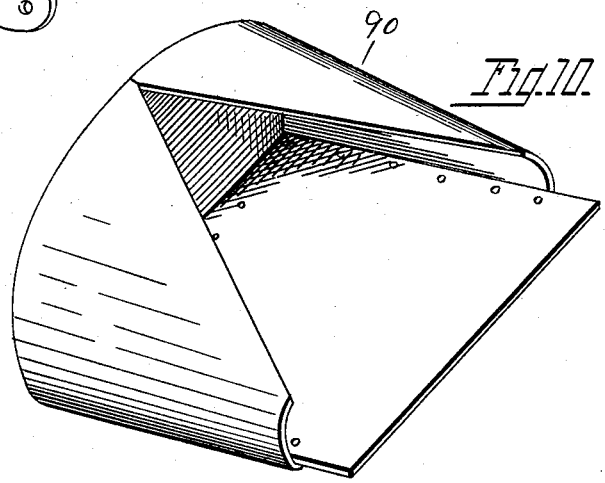
WITNESSES
Carroll J. Webster
Maud Schumacher
INVENTOR
Orien R. Smith
By William Webster
Atty

UNITED STATES PATENT OFFICE.

ORIEN R. SMITH, OF ATHENS, MICHIGAN.

DITCHING-MACHINE.

SPECIFICATION forming part of Letters Patent No. 592,101, dated October 19, 1897.

Application filed June 26, 1896. Serial No. 596,979. (No model.)

*To all whom it may concern:*

Be it known that I, ORIEN R. SMITH, of Athens, county of Calhoun, and State of Michigan, have invented certain new and useful Improvements in Ditching-Machines; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a ditching-machine of that character in which gasolene, air, steam, or like motive power is employed in its propulsion and also in the several operations of its motive parts.

The objects of the invention are to provide in a ditching-machine, first, novel means for propelling the same mechanically which consists in mechanism whereby a slow movement can be attained during the operation of digging a ditch, or if desired faster movement in either direction when the machine is upon the road to be transported from the different places of use; second, to provide a novel form of a combined digger and elevator and means for adjusting the same vertically to gage the depth of the ditch, and, third, to provide a carrier to receive the dirt from the elevator and carry the same in rear of the machine either into the ditch to cover the tile or at the side of the ditch as desired.

The invention therefore consists in the parts and combination of parts as hereinafter shown, described, and claimed.

In the drawings, Figure 1 is a side elevation of a complete ditching-machine constructed in accordance with my invention. Fig. 2 is a plan view of the rear half thereof, certain parts being omitted, this view, however, being diagrammatic of and illustrating more particularly the mechanism employed for controlling the speed and also the direction of travel of the machine. Fig. 3 is a plan view of the forward portion of the machine, illustrating more particularly the endless carrier for receiving and conveying the dirt from the combined digger and elevator into the ditch or at the side of the same. Fig. 4 is a sectional view on lines $xx$, Fig. 3, illustrating more particularly the mechanism by which the carrier is revolved. Fig. 5 is a sectional view of the carrier, taken at a point indicated by the dotted lines $yy$, Fig. 3. Fig. 6 is a longitudinal vertical sectional view of the combined digger and elevator frame, illustrating more particularly the mechanism employed to impart motion to the combined digger and carrier. Fig. 7 is a sectional view of said frame, taken at a point indicated by lines $zz$, Fig. 6. Fig. 8 is a detail view of a portion of the endless chain, illustrating the cutting-knives and elevator-buckets secured thereto. Fig. 9 is a detail view of one of the cutting-knives. Fig. 10 is a detail view of one of the elevator-buckets. Fig. 11 is a detail view of the rack-bar, a portion of the rack-bar and the pinion connected therewith through the medium of which the machine is thrown into gear for digging. Fig. 12 is a detail view of the pinion operated by the construction shown in Fig. 11, illustrating the carrier therefor. Fig. 13 is a sectional elevation of the same, taken at a point indicated by lines $vv$, Fig. 12. Fig. 14 is a sectional view of one of the side sills, illustrating the attachment of one of the clutch-operating levers thereto. Fig. 15 is a sectional elevation of the boxing and pitman connection for revolving the carrier-belt, this view being taken at a point indicated by the lines 1 1, Fig. 4.

1 designates the engine, which may be operated either by steam, gasolene, air, or gas as a motive power, and 2 is a crank-shaft which is revolved thereby.

3 designates the main power propulsion-shaft, which receives motion from the crank-shaft through the medium of the sprocket-chain running over the sprocket-wheel 4 upon the said shaft 3, which is journaled in the boxings 5, secured upon the side sills 6 of the frame.

7 and 8 designate shafts journaled in the boxings 9 and 10, respectively secured upon the side sills 6, which receive motion from the power-shaft 3 through the medium of the gear-wheels 11 and 12 and the sprocket-chain 13, respectively.

14 and 15 designate shafts journaled in depending hangers secured to the side sills, which receive motion from the shafts 7 and 8, respectively, through the medium of gear-wheels 12, 16, 17, and 18, respectively located upon said shafts.

19 designates the rear axle, upon which is secured the rear supporting-wheels 20, and secured upon the axle 19 between the sills 6 and the rear supporting-wheels 20 are secured gear-wheels 21. Located upon the shafts 14 and 15, respectively, and at each end of the same, are gear-wheels 22, which mesh at all times with the gear 21, and located upon shafts 7 and 8 upon each end of the same are beveled gears 23 and 24, respectively, which mesh at all times with the beveled gears 25 and 26, respectively located upon shafts 27, arranged upon each side of the machine. Secured upon shafts 27 are worm-gears 28, which are movable longitudinally thereon and held from rotary movement by a spline 29, said worm-gear being in position to mesh with the gear-wheel 21.

30 designates a plate having a longitudinal groove 31, in which slides a boxing 32, which embraces the worm-gears 28, as shown in Figs. 12 and 13.

33 designates a frame secured upon the side sills 6, having a longitudinal slot 34, the upper side of said slot being cogged, as at 35, and movable longitudinally in said slot 34 is a pinion 36, secured upon a shaft 37, revolved by means of a crank 38, secured upon one end of said shaft. 39 designates rods which connect the outer ends of said shaft 37 and the boxing 32. 40 designates disks secured upon each end of said shaft 37, having peripheral notches 41 secured therein, which are connected by the spring-pressed dog 42, as shown more specifically in Fig. 1. There are preferably three dogs 42 arranged upon upon each side of the machine and secured to the sills 6, which are retracted through the medium of chains or ropes 43, connected thereto and passing around drums upon a shaft 44, operated by a handle 45, located upon one side of the machine, there being a ratchet-wheel 46 secured adjacent to the handle, which is connected by a spring-pressed dog 47, by which means the dogs 42 may be held in a retracted position. Located upon shafts 7, 8, 14, and 15 are clutches 48, 49, 50, and 51, respectively, the operating-levers of which are all carried forward and connected with the handles 48', 49', 50', and 51', respectively located upon one side of the machine, each handle being preferably recessed to engage with the corresponding-shaped projection 53' upon each of the guides 53". (See Fig. 14.)

While I have shown and described one form of clutch and operating mechanism, it will be readily understood that I do not wish to limit myself thereto, but may use any of the well-known forms and operate them in any manner desired, the essential feature in the operation being that the operating-handles are located at one side of the machine above the operator's platform 84.

Thus far I have described the mechanism by which the machine is propelled, either slowly for the operation of digging, or at a greater speed in traveling from one place of operation to another, the operation of which is as follows: When it is desired to travel in the direction of the arrow $b$, Fig. 2, the clutch 48 is thrown out, which allows gear-wheel 12 to run idle upon the shaft 7, and clutch 49 is thrown out of engagement and clutch 51 is thrown into engagement. Therefore motion is imparted to the shaft 15 through the medium of the sprocket-chain and gear-wheels 17 and 18, which consequently impart motion to the gear-wheels 22 and the gear-wheel 21, located upon the rear axle, which moves the chain backwardly. To cause the machine to travel in the direction of the arrow $a$ and at the same speed, clutch 49 is thrown out of engagement and the clutch 50 is thrown into engagement, which through the medium of the gears 11, 12, and 16 impart motion to the gear-wheels 22 upon shaft 14 and revolves the gear 21 and the shaft in the opposite direction. To accomplish this operation, the worm-gear 28 is thrown out of engagement with the gear 21 by revolving crank 38, which causes the pinion 36 to travel either forward or backward, carrying the boxing 32 and consequently the worm-gear with it. To impart slow motion to the rear driving-wheel, the worm-gear is thrown into engagement with the gear 21, the clutches 50 and 51 are thrown out of engagement, and either the clutch 48 or 49 is thrown in to impart the desired direction of motion to the shaft 27, worm-gear 28, and consequently to the gear 21 and the wheels 20.

52 designates the main digger and elevator shaft, which is journaled in suitable boxings in the side sills 6, and 53 designates a shaft parallel therewith and receiving motion therefrom through the medium of the gears 54 and 55.

56 designates cross-sills connecting suitable braces secured above and below each of the side sills 6, and carried thereby is a digger and elevator frame, which consists of two longitudinal sections 57. (Shown in cross-section in Fig. 7.) Secured to the interior thereof and longitudinally of the same are ribs 58, which travel in grooves 59 in rollers 60, one secured upon each side of each cross-sill 56, and by which the digger and elevator frame is secured and guided vertically.

Secured at each end of the elevator-frame are disks 61, in which are journaled transverse shafts 62, having located thereon a beveled pinion 63 and meshing therewith a like beveled pinion 64, secured upon a square shaft 65, journaled in hangers 66, one secured at each end of the frame, said shaft extending the entire length of the frame and passing through the orifices in the cross-sills 56. Beveled pinions 63 are located upon the shafts 62, one of vertical alinement and mesh with pinions 64 upon opposite sides thereof, respectively, whereby shafts 62 and the mechanism carried thereby move in unison and in the same direction.

Secured upon each end of the shafts 62 at the outside of the frame are wheels 67, over which the sprocket-chain 68 runs. Said wheels 67 are preferably formed octagonal in conformation, this design being specially applicable to my peculiar construction of sprocket-chain. Secured upon shaft 53 in alinement with the wheels 67 are sprocket-wheels 69, over which the sprocket-chain 68 runs and by which motion is imparted thereto. Secured upon the shaft 53 is a beveled gear-wheel 70, which meshes with a beveled gear-wheel 71, secured to the upper cross-sill 56 and through which the shaft 65 passes. Therefore when the shaft 52 is revolved motion is imparted to the shaft 53, consequently to the shaft 65 and each shaft 62, which move in unison with the sprocket-wheel 69 and assist in moving the chain, by which means the chain is moved and the digging and elevating process is carried out, it being understood that the sprocket-chain 68 carries the cutting-knives and elevator-buckets, as will be hereinafter more fully described.

To move the digger and elevator frame longitudinally to vary the cut of the knives and consequently the depth of the ditch, I journal the shaft 72 transversely of the frame in boxings secured to the upper edge of the upper cross-sill 56, upon which is a drum 73, and wound around said drum is a cable, the ends 74 and 75 of which connect with the upper and lower ends, respectively, of the frame. Journaled in suitable boxings secured upon each of the side sills 6 is a transverse shaft 76, which receives motion from the shaft 52 through the medium of gear-wheels 77 and 78, located upon said shaft respectively, and located upon said shaft 76 is a beveled gear 79, with which a like beveled gear 80 meshes upon a shaft 81, which carries at its upper end a worm-wheel 82, which meshes with a gear 83, located upon the shaft 72. Located upon one end of the shaft 76 adjacent to the platform 84 is a handle 85, by which means said shaft may be revolved manually, there being a clutch 86 to embrace the squared end of said shaft to hold the same in any predetermined position, said clutch being operated by a foot-treadle 87, having a rod 88 connecting the same. Chain 68 comprises side links of alternate varying lengths, one long link 89 upon which are alternately secured the elevator-buckets 90 and another long link upon which are secured the cutters 91 and a short link 92 interposed between the same. Great difficulty has been occasioned in the use of a sprocket-chain to which elevator-buckets are secured, inasmuch as the chain will be forced out from alinement, due to the weight of a load bearing upon one of the links. To overcome this difficulty, I have provided the short links 92, as described, and overlap the base of each succeeding bucket or cutter, so that there is a resistance to the tipping of the bucket or knives, which therefore holds the chain, and consequently anything attached thereto, in proper alinement.

The operation of the digger and elevator is as follows: Shaft 52 being thrown into engagement with a sprocket-wheel 52′ by a clutch 93 thereon which receives motion from the power-shaft 2 through the medium of the sprocket-chain 52″ first imparts motion to the shaft 76 through the medium of the gears 77 and 78, (after the clutch 94 has been thrown into engagement,) which imparts motion to the shaft 72 through the medium of shaft 81, and consequently raises said digger-frame to any desired height, when it can be lowered and adjusted to the proper depth by means of a handle 85, the clutch 94 being previously thrown out of engagement, when, after the frame is set, the clutch 86 is allowed to engage the shaft 76 and hold the digger-frame in its adjusted position, motion being imparted to the shaft 53 is imparted to the sprocket-chain, as has been described, which causes the alternate cutters and carriers to be revolved and to cut and elevate the dirt, as shown in Fig. 1, it being understood that to insure an evenness in the bottom of the ditch the elevator-frame is raised or lowered as the machine passes over a depression or a rise in the ground manually, which therefore allows of the ditch having a level bottom irrespective of the irregular outline of the ground over which the machine travels.

95 designates a platform suspended from the machine by means of rods 96, carrying rollers 97 upon their upper ends, which run upon a trackway 98, said platform being adapted to receive the tile, from where it is conveniently carried and placed in the ditch by a second operator.

99 designates a carrier for the dirt, extending from a point beneath the upper end of the elevator-frame, being supported at one end by a transverse shaft 100, the ends of which engage in a slot 101 in a standard 102, secured to each of the side sills, the opposite end being supported upon a curved bar 103, passing through the side sills 104 of the carrier-frame and secured in the standards 105, secured to each of the side sills 6. The carrier is of less width than the side sills 6 and is held from lateral movement upon the shaft 100 by caps 106. Journaled in suitable boxings secured to the side sills is a transverse shaft 107, which receives motion from the sprocket-wheel 108, secured upon the shaft 53 through the medium of the sprocket-chain 109.

110 designates a crank midway of said shaft 107, and secured thereto is a boxing 111. Journaled transversely of the side sills 104 of the carrier is a shaft 112, having disks 113 arranged eccentrically upon each end, with which and the boxing 111 are connected pitmen 114. Therefore as shaft 107 revolves motion is imparted to shaft 112, and consequently to the rollers 115, secured upon said shaft, over which and a plurality of rollers 116, located along the length of the carrier, (see Fig. 5,) runs the carrier-belt 117.

118 designates side guides extending above the end of the carrier beneath the upper end of the elevator-frame which acts, when the dirt falls upon the carrier, to throw the same centrally thereof. By means of the slots 101 in the standards 102 and the attachment of the carrier upon the shaft 100, if desired, I may swing the free end of the carrier to one side and adjust the several parts accordingly, so that the central portion of the shaft 112 is directly over the boxing 111, there being a swivel in the boxing which allows of motion being imparted to the carrier, as has been described.

119 designates the forward axle, upon which the front wheels are secured, which is pivotally connected with the frame, and connected thereto at each end and running over drums upon a shaft 120, secured in suitable boxings to the side sills 6, are ropes or cables 121, whereby when the said shaft 120 is revolved said axle 119 is turned and the machine is guided. To revolve shaft 120, I have provided upon one end of said shaft a gear-wheel 122, and meshing therewith a gear-wheel 123 upon a shaft 124, the rear end of said shaft having a handle 125 located above the platform in easy reach of the operator.

What I claim is—

1. In a ditching-machine, a frame having an engine supported thereon, a main power-shaft receiving motion from the engine, the rear axle, gear-wheels secured thereto, shafts carrying worm-gears, said shafts receiving motion from the main power-wheel, said worm-gears secured in boxings movable over the gear-wheel upon the rear axle, and means for moving said boxings longitudinally to engage the worm-gear with the gear-wheel or to disengage the same therefrom as desired.

2. In a ditching-machine, a frame supported on front and rear wheels, an engine carried by the frame, a main power-shaft receiving motion from the engine, parallel shafts journaled in boxings secured to the frame receiving motion from the main power-shaft and gear-wheels upon the rear axle, and pinions and worm-gears meshing therewith receiving motion from the parallel shafts heretofore mentioned, clutches upon the parallel shafts, and independent means for operating the same located upon one side of the machine whereby the speed and direction of travel of the machine are regulated.

3. In a ditching-machine, a frame supported upon front and rear wheels, an engine located thereon, a power-shaft journaled upon the frame receiving motion from the engine, cross-sills, an elevator-frame supported and guided by the cross-sills, a transverse shaft located substantially centrally of the frame longitudinally receiving motion from the said power-shaft, a vertical shaft within the elevator-frame receiving motion from said shaft, transverse shafts at each end of the elevator-frame receiving motion from the vertical shaft, sprocket-wheels located upon each transverse shaft, and a sprocket-chain carried thereby carrying alternate cutters and elevator-buckets and means for adjusting the elevator-frame, and a chain carried thereby vertically.

4. In a ditching-machine, a frame supported upon front and rear axles, transverse sills secured in vertical alinement above and below the frame and at an angle thereto, antifriction-rollers secured to the cross-sills upon each side thereof, an elevator-frame consisting of longitudinal side sections having guide-strips secured thereto for engagement with the antifriction-rollers upon the transverse sills, and means for adjusting the frame vertically, a sprocket-chain carried by the elevator-frame, and alternate cutters and elevator-buckets secured thereon.

5. In a ditching-machine, a frame mounted upon front and rear wheels, an engine, a transverse shaft 107 receiving power from the engine, a crank located centrally of said shaft, a boxing secured upon said crank, a carrier supported above the frame upon transverse supports and movable laterally upon said supports, rollers located along the length of the carrier, a belt running over said rollers, the shaft of the roller at one end having disks upon the outer end of the same, pitmen connecting said disks and the boxing upon the crank of the shaft, whereby motion is imparted to said shaft and said carrier-belt.

6. In a ditching-machine, a frame mounted upon front and rear wheels, an engine located upon the frame, an elevator-frame, digger-chain carried thereby and receiving motion from the engine, cutting-knives and elevator-buckets secured upon a base projecting in front and rear thereof respectively, the knives and buckets being arranged alternately upon the longer links, the base thereof projecting to engage the succeeding base whereby tipping of the knife or bucket is prevented.

In testimony that I claim the foregoing as my own I hereby affix my signature in presence of two witnesses.

ORIEN R. SMITH.

Witnesses:
CARROLL J. WEBSTER,
MAUD SCHUMACHER.